(12) United States Patent
Bandic et al.

(10) Patent No.: US 8,793,431 B2
(45) Date of Patent: *Jul. 29, 2014

(54) SHINGLED MAGNETIC RECORDING DISK DRIVE WITH INTER-BAND DISK CACHE AND MINIMIZATION OF THE EFFECT OF FAR TRACK ERASURE ON ADJACENT DATA BANDS

(75) Inventors: Zvonimir Z. Bandic, San Jose, CA (US); Cyril Guyot, San Jose, CA (US); Tomohiro Harayama, Sunnyvale, CA (US); Robert Eugeniu Mateescu, San Jose, CA (US); Shad Henry Thorstenson, Rochester, MN (US); Timothy Kohchih Tsai, Alviso, CA (US)

(73) Assignee: HGST Netherlands B.V., Amsterdam (NL)

( * ) Notice: Subject to any disclaimer, the term of this patent is extended or adjusted under 35 U.S.C. 154(b) by 261 days.

This patent is subject to a terminal disclaimer.

(21) Appl. No.: 13/423,178

(22) Filed: Mar. 17, 2012

(65) Prior Publication Data

US 2013/0246703 A1    Sep. 19, 2013

(51) Int. Cl.
G06F 12/00    (2006.01)

(52) U.S. Cl.
USPC ............... 711/113; 711/112; 711/E12.019; 360/31; 360/40; 360/48; 360/50; 360/58

(58) Field of Classification Search
USPC ........ 711/112, 113, E12.019; 360/31, 40, 48, 360/50, 58
See application file for complete search history.

(56) References Cited

U.S. PATENT DOCUMENTS

| | | | |
|---|---|---|---|
| 5,600,500 A | 2/1997 | Madsen et al. | |
| 6,185,063 B1 | 2/2001 | Cameron | |
| 6,442,705 B1 | 8/2002 | Lamberts et al. | |
| 6,947,234 B2 | 9/2005 | Lamberts et al. | |
| 6,967,810 B2 | 11/2005 | Kasiraj et al. | |
| 7,227,708 B2 | 6/2007 | Feng | |
| 7,567,400 B2 | 7/2009 | Cheng | |
| 8,208,215 B2 * | 6/2012 | Molaro et al. | 360/71 |
| 8,385,162 B2 * | 2/2013 | Rosen et al. | 369/13.33 |
| 2006/0066971 A1 | 3/2006 | Alex et al. | |

(Continued)

OTHER PUBLICATIONS

D. Guarisco et al., "A Fast and Accurate Method for Measuring Adjacent-Track Erasure", IEEE Transactions on Magnetics, vol. 42, No. 12, Dec. 2006, pp. 3868-3873.

(Continued)

Primary Examiner — Jasmine Song
(74) Attorney, Agent, or Firm — Thomas R. Berthold

(57) ABSTRACT

A shingled magnetic recording hard disk drive that uses writeable cache tracks in the inter-band gaps between the annular data bands minimizes the effect of far track erasure (FTE) in the boundary regions of annular data bands caused by writing to the cache tracks. Based on the relative FTE effect for all the tracks in a range of tracks of the cache track being written, a count increment (CI) table or a cumulative count increment (CCI) table is maintained. For every writing to a cache track, a count for each track in an adjacent boundary region, or a cumulative count for each adjacent boundary region, is increased. When the count value for a track, or the cumulative count for a boundary region, reaches a predetermined threshold the data is read from that band and rewritten to the same band.

15 Claims, 9 Drawing Sheets

(56) References Cited

U.S. PATENT DOCUMENTS

2009/0091861 A1    4/2009    Takano et al.
2009/0244775 A1   10/2009   Ehrlich
2013/0142024 A1*  6/2013    Sanvido et al. ............ 369/53.41

OTHER PUBLICATIONS

Li et al., "Adjacent Track Erasure Analysis and Modeling at High Track Density", IEEE Transactions on Magnetics, vol. 39, No. 5, Sep. 2003, pp. 2627-2629.

Y. Liu et al., "Characterization of Skip or Far Track Erasure in a Side Shield Design", IEEE Transactions on Magnetics, vol. 45, No. 10, Oct. 2009, pp. 3660-3663.

Awerbuch, "Optimal distributed algorithms for minimum weight spanning tree, counting, leader election, and related problems", Proceedings of the nineteenth annual ACM symposium on Theory of computing, 1987, pp. 230-240.

Fern et al., "Boosting Lazy Decision Trees", Proceedings of the Twentieth International Conference on Machine Learning (ICML-2003), Washington DC, 2003, vol. 20; Part 1, pp. 178-185.

Friedman et al., "Lazy Decision Trees", Proceedings of the National Conference on Artificial Intelligence, 1996, No. 13//V1, pp. 717-724.

* cited by examiner

| SDT # | Δlog (BER) | Count Increment (CI) |
|---|---|---|
| -16 | 0 | 0 |
| -15 | 0.5 | 0 |
| -14 | 0.75 | 1 |
| -13 | 1 | 2 |
| -12 | 2.5 | 56 |
| -11 | 2.3 | 35 |
| -10 | 2 | 18 |
| -9 | 1.75 | 10 |
| -8 | 0 | 0 |
| -7 | 0 | 0 |
| -6 | 0.25 | 0 |
| -5 | 0.28 | 0 |
| -4 | 0.28 | 0 |
| -3 | 0.25 | 0 |
| -2 | 0.2 | 0 |
| -1 | 0.75 | 1 |

| SDT # | Δlog (BER) | Count Increment (CI) |
|---|---|---|
| +16 | 0 | 0 |
| +15 | 0 | 0 |
| +14 | 0 | 0 |
| +13 | 0 | 0 |
| +12 | 0 | 0 |
| +11 | 0 | 0 |
| +10 | 0 | 0 |
| +9 | 0 | 0 |
| +8 | 0 | 0 |
| +7 | 0 | 0 |
| +6 | 0 | 0 |
| +5 | 0 | 0 |
| +4 | 0 | 0 |
| +3 | 0 | 0 |
| +2 | 0.25 | 0 |
| +1 | 1.3 | 4 |

FIG. 4

| CTR # | BR1 CCI | BR2 CCI |
|---|---|---|
| 3 | 28 | 39 |
| 2 | 27 | 42 |
| 1 | 27 | 42 |

FIG. 6

SHINGLED MAGNETIC RECORDING DISK DRIVE WITH INTER-BAND DISK CACHE AND MINIMIZATION OF THE EFFECT OF FAR TRACK ERASURE ON ADJACENT DATA BANDS

RELATED APPLICATION

This application is related to application Ser. No. 13/423,177 filed Mar. 17, 2012 concurrently with this application and titled "SHINGLED MAGNETIC RECORDING DISK DRIVE WITH MINIMIZATION OF THE EFFECT OF FAR TRACK ERASURE ON ADJACENT DATA BANDS" which is now U.S. Pat. No. 8,537,481 B1.

BACKGROUND OF THE INVENTION

1. Field of the Invention

This invention relates generally to magnetic recording hard disk drives (HDDs), and more particularly to a shingled magnetic recording (SMR) HDD that minimizes the effect of far track erasure (FTE) on data tracks in the boundary regions of data bands.

2. Description of the Related Art

Magnetic recording disk drives that use "shingle writing", also called "shingled recording" or "shingled magnetic recording" (SMR), have been proposed, for example as described in U.S. Pat. No. 6,185,063 B1 and U.S. Pat. No. 6,967,810 B2. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. The shingled data tracks are arranged on the disk as annular bands separated by annular inter-band gaps or guard bands.

In application Ser. No. 13/135,953, filed Jul. 18, 2011, published as U.S. 2012/0300328 A1 and assigned to the same assignee as this application, a SMR disk drive is described that has on-disk cache. Writeable cache tracks are located in the inter-band gaps. Data from the host is transferred to the disk drive's internal memory, typically DRAM, and then written to cache tracks in an inter-band gap between two data bands. When the disk drive is idle, the data is then read from the cache tracks and written to a data band.

A problem in both conventional HDDs and SMR HDDs is wide-area track erasure (WATER) or far track encroachment or erasure (FTE). The write field from the write head is wider than a data track so when the write head is writing to a track, the outer portions of the write field (called the fringe field) overlap onto tracks other than the track being written. Data degradation due to fringe fields is not limited to the tracks immediately adjacent the track being written, but can extend over a range of tracks relatively far from the track being written. This FTE is particularly noticeable with write heads that have side shields. FTE may not affect tracks symmetrically on both sides of the track being written. Tracks on one side may encounter more pronounced FTE effects due to the write head shield design or due to read-write head skew. FTE is described by Liu et al., "Characterization of Skip or Far Track Erasure in a Side Shield Design", *IEEE TRANSACTIONS ON MAGNETICS*, VOL. 45, NO. 10, OCTOBER 2009, pp. 3660-3663. U.S. application Ser. No. 12/831,391 filed Jul. 19, 2010, and assigned to the same assignee as this application, describes a conventional HDD where the effect of FTE is minimized by counting the number of writes, incrementing counters based on the known effect of FTE on each track within a range of the track being written, and then rewriting the data when a count reaches a predetermined threshold.

In a SMR disk drive, FTE can occur on the tracks in the boundary regions of bands, i.e., those tracks near the inter-band gaps, when data is written to the cache tracks in the inter-band gaps. What is needed is a SMR HDD that minimizes the effect of FTE from writing to the cache tracks.

SUMMARY OF THE INVENTION

The invention relates to a SMR HDD that uses on-disk cache in the form of writeable cache tracks in the inter-band gaps between the annular data bands, and minimizes the effect of FTE in the boundary regions of annular data bands caused by writing to the cache tracks. The extent of the FTE effect is determined for each track within a range of tracks of the cache track being written. In one implementation, based on the relative FTE effect for all the tracks in the range, a count increment (CI) is determined for each track. The CI values and their associated track numbers within the range may be stored as a table in memory. A counter is maintained for each track in each boundary region. For every writing to a cache track in an inter-band gap, a count for each track in an adjacent boundary region that is within a range of the cache track being written is increased by the associated CI value. When the count value for a track reaches a predetermined threshold the data is read from that band and rewritten to the same band. In another implementation of the invention, a single cumulative count is maintained for each boundary region of each band and the cumulative count is increased by a cumulative count increment (CCI) for each writing to a cache track. When the cumulative count value for a boundary region of a band reaches a predetermined threshold the data is read from that band and rewritten to the band. Because a HDD typically includes multiple disk surfaces, each with an associated read/write head, and because not all heads will have the same exact write profiles and thus not generate the same FTE effect, a CI table or CCI table can be developed for each head and its associated disk surface.

For a fuller understanding of the nature and advantages of the present invention, reference should be made to the following detailed description taken together with the accompanying figures.

BRIEF DESCRIPTION OF THE DRAWING

FIG. 4 is a table of track number, BER value, and calculated count increment for tracks within a range of tracks for the perpendicular write head that produced the BER data of FIG. 3.

FIG. 6 is a cumulative count increment (CCI) table for counting the effect of FTE on band boundary regions using a single counter.

DETAILED DESCRIPTION OF THE INVENTION

Figure 1:
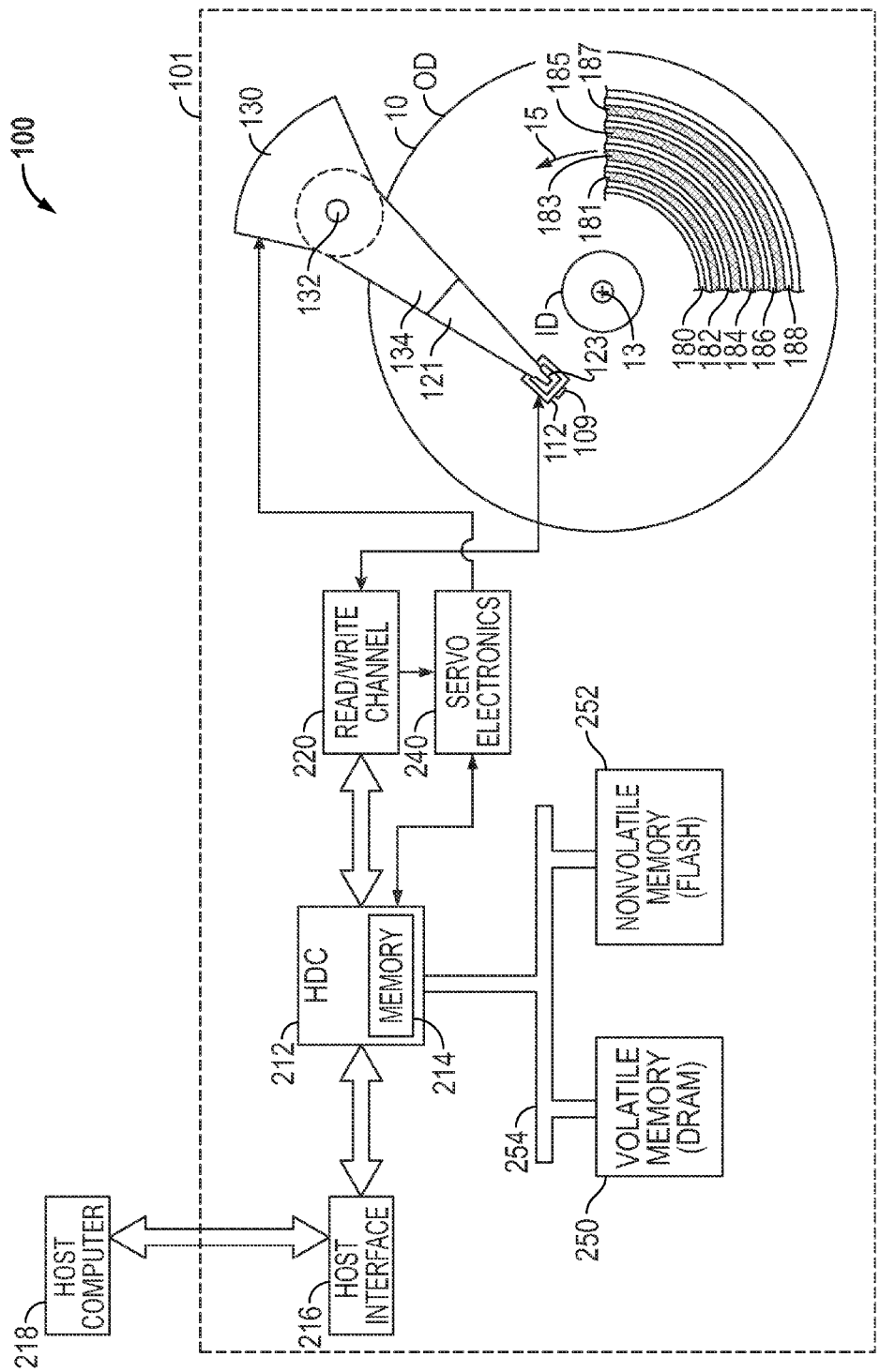
FIG. 1 is a top view of a SMR disk drive for use with the method according to the invention.

FIG. 1 is a top view of a disk drive 100 with shingled recording according to the invention. The disk drive has a housing or base 101 that supports an actuator 130 and a spindle motor (not shown) for rotating the magnetic recording disk 10 about its center 13 in the direction indicated by arrow 15. The actuator 130 may be a voice coil motor (VCM) rotary actuator that has a rigid arm 134 and rotates about pivot 132. A head-suspension assembly includes a suspension 121 that has one end attached to the end of actuator arm 134, a flexure 123 attached to the other end of suspension 121, and a head carrier, such as an air-bearing slider 122, attached to the flexure 123. The suspension 121 permits the slider 122 to be maintained very close to the surface of disk 10 and the flexure 123 enables the slider 122 to "pitch" and "roll" on an air-bearing generated by the rotating disk 10. The slider 122 supports the read/write or recording head 109 located on the end face 112 of slider 122. The recording head 109 is typically a combination of an inductive write head with a magnetoresistive read head (also called a read/write head). Only one disk surface with associated slider and recording head is shown in FIG. 1, but there are typically multiple disks stacked on a hub that is rotated by a spindle motor, with a separate slider and recording head associated with each surface of each disk.

In this invention the disk drive uses shingled magnetic recording (SMR), also called shingled writing. Thus FIG. 1 also illustrates portions of the circular shingled data tracks grouped as annular regions or bands on the recording layer of disk 10. Only portions of five bands 180, 182, 184, 186 and 188 are depicted, but there would typically be a large number of bands. Adjacent bands are separated by inter-band annular gaps, such as typical gaps 181, 183, 185 and 187. For example, for a 2.5 inch disk drive with shingled recording, the shingled data tracks may have a cross-track width (TW) of about 50 nm with each band containing several hundred tracks. In this invention at least some of the inter-band gaps contain writeable cache tracks. For example, gaps 185, 187 may contain a group of several, e.g., 2-5, cache tracks with a non-writeable guard track between the cache tracks and each adjacent data band.

In shingled recording the write head, which is wider than the read head in the cross-track direction, writes magnetic transitions by making a plurality of consecutive circular paths or tracks that partially overlap. The non-overlapped portions of adjacent paths or tracks form the shingled data tracks, which are thus narrower than the width of the write head. The data is read back by the narrower read head. When data is to be re-written in a shingled data track, all of the shingled data tracks that have been written after the track to be re-written are also re-written.

As is well known in the art, the data in each shingled data track in each of the bands is also divided into a number of contiguous physical data sectors (not shown). Each data sector is preceded by a synchronization (sync) field, which is detectable by the read head for enabling synchronization of reading and writing the data bits in the data sectors. Also, each shingled data track in each of the bands includes a plurality of circumferentially or angularly-spaced servo sectors (not shown) that contain positioning information detectable by the read head for moving the read/write head 109 to the shingled data tracks and maintaining the read/write head 109 on the tracks. The servo sectors in each shingled data track are typically aligned circumferentially with the servo sectors in the other shingled data tracks so that they extend across the shingled data tracks in a generally radial direction.

The disk drive 100 also includes a hard disk controller (HDC) 212 that can include and/or be implemented by a microcontroller or microprocessor. The controller 212 runs a computer program that is stored in memory 214 and that embodies the logic and algorithms described further below. The memory 214 may be separate from controller 212 or as embedded memory on the controller chip. The computer program may also be implemented in microcode or other type of memory accessible to the controller 212. The controller 212 is connected to a host interface 216 that communicates with the host computer 218. The host interface 216 may be any conventional computer-HDD interface, such as Serial ATA (Advanced Technology Attachment) or SCSI (Small Computer System Interface).

The electronics associated with disk dive 100 also include servo electronics 240. In the operation of disk drive 100, the read/write channel 220 receives signals from the read head and passes servo information from the servo sectors to servo electronics 240 and data signals from the data sectors to controller 212. Servo electronics 240 typically includes a servo control processor that uses the servo information from the servo sectors to run a control algorithm that produces a control signal. The control signal is converted to a current that drives actuator 130 to position the read/write head 109. In the operation of disk drive 100, interface 216 receives a request from the host computer 218 for reading from or writing to the data sectors. Controller 212 receives a list of requested data sectors from interface 215 and converts them into a set of numbers that uniquely identify the disk surface, track and data sector. The numbers are passed to servo electronics 240 to enable positioning read/write head 109 to the appropriate data sector.

The controller 212 acts as a data controller to transfer blocks of write data from the host computer 218 through the read/write channel 220 for writing to the disk 10 by the write head, and to transfer blocks of read data from the disk 10 back to the host computer 218. Disk drives typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. Disk drives may also include nonvolatile memory. One type of nonvolatile memory is "flash" memory, which stores information in an array of floating gate transistors, called "cells" which can be electrically erased and reprogrammed in blocks. Thus in disk drive 100, the controller 212 also communicates with volatile memory 250 (shown as DRAM) and optional nonvolatile memory 252 (shown as FLASH) via data bus 254. In this invention, the SMR disk dive also includes on-disk cache in the form of writeable cache tracks located in the inter-band gaps. Data is transferred from the DRAM cache and written to the on-disk cache and then, during disk drive idle times, the data is read from the on-disk cache and written to the data bands.

Figure 2:
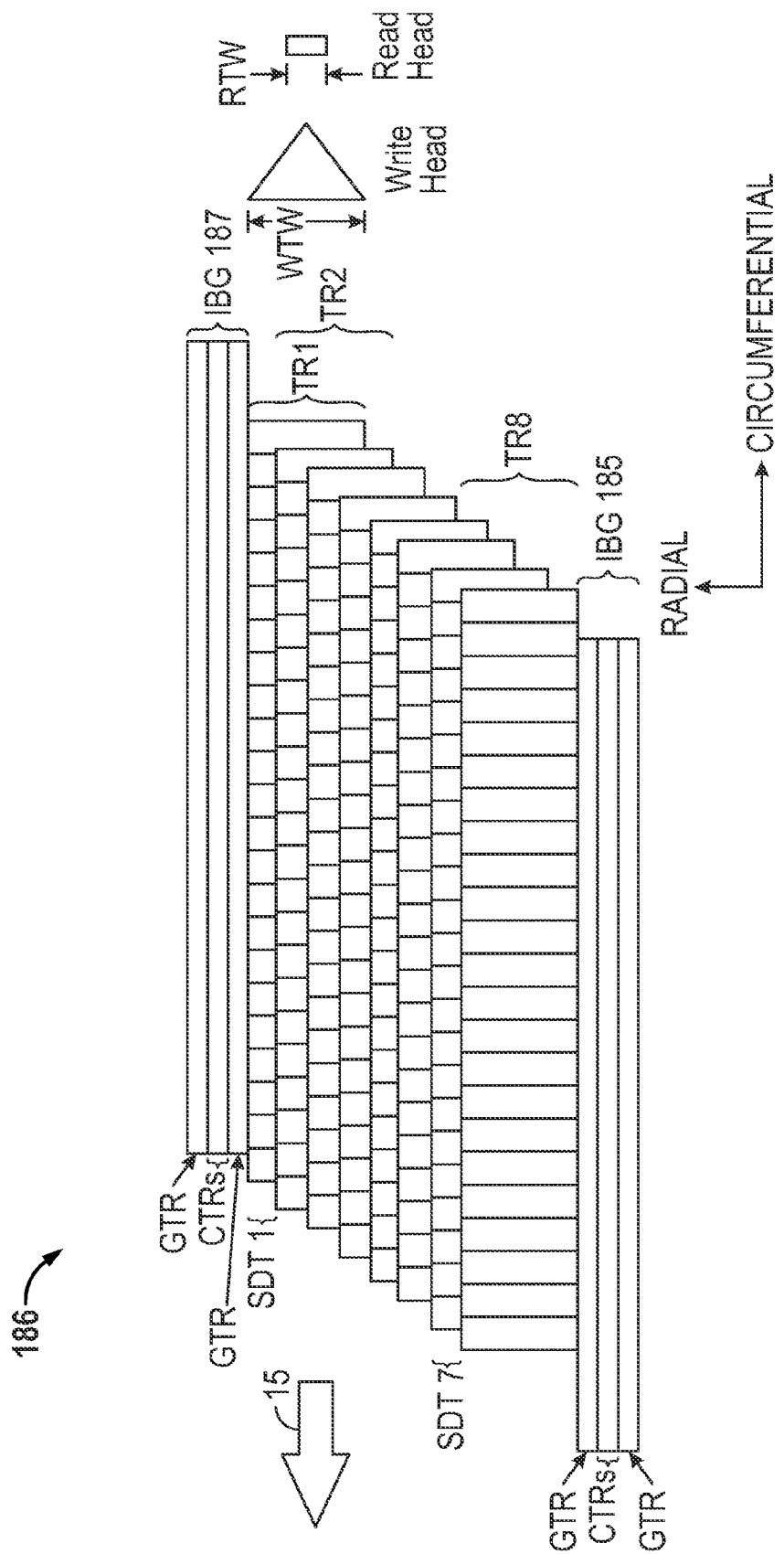
FIG. 2 is a schematic showing a typical data band on a SMR disk and illustrates the multiple overlapping tracks that define the shingled data tracks and the inter-band gaps (IBGs) having writeable cache tracks (CTRs) like in this invention.

FIG. 2 is a schematic of a shingled region or band, like band 186, for use in describing the method of SMR. A typical band will have a large number, i.e., several hundred or thousand, shingled data tracks (SDTs); however only 7 are shown in band 186 for ease of illustration. Band 186 has inter-band gaps (IBGs) 185, 187 that separate it from radially adjacent bands. In this invention, each of IBGs 185, 187 includes a group of writeable cache tracks (CTRs) and non-writeable guard tracks (GTRs) that separate the CTRs from the adjacent data bands. The write head makes successive paths or tracks (TRs) to form the SDTs which, in the example of FIG. 2, are written in the direction from disk outside diameter (OD) to disk inside diameter (ID). The write pole tip of the write head has a cross-track width (WTW) that is wider than the sensing edge of the read head cross-track width (RTW). When writing data, the write head generates paths of magnetic transitions, represented by the vertical lines, as the recording layer moves in the direction of arrow 15. For example, the actuator positions the write head to write data along track 1 (TR1), then moves the write head to write data along track 2 (TR2). The writing of data along TR2 overwrites a portion of the previously written TR1 and thus "squeezes" the data of TR1 to thereby form the first shingled data track (SDT1). In the example of FIG. 2, the shingled data tracks are written in the direction from the disk OD to ID. However, a disk drive can be formatted such that writing of the shingled data tracks in one or more bands can be from ID to OD, with different bands being written in different directions.

In general, in SMR, whenever any portion of the data in an annular band is to be re-written or updated, all of the shingled data tracks in that annular band that were written after the shingled data track being updated are also re-written. The writing of data to an entire band may occur when new data from the host is stored in memory and then written to a band for the first time. It may also occur when a portion of the data in a band is modified, i.e., a "read-modify-write" operation in which all the data in a band is read and stored in memory, then a portion is modified with the host-provided new write data, and finally all the data is written data back to the band. The writing of data to an entire band or bands may also occur when a band or bands are "cleaned" or "de-fragmented" to reclaim free space, i.e., the data in one or more bands is read and stored in memory and then re-written to the same band or a new band.

A problem in both conventional HDDs and SMR HDDs is wide-area track erasure (WATER) or far track encroachment or erasure (FTE). The write field from the write head is wider than a data track so when the write head is writing to a track, the outer portions of the write field (called the fringe field) overlap onto tracks other than the track being written. The fringe fields can extend over a range of tracks relatively far from the track being written. FTE generally translates into an increase in bit error rate (BER), resulting in degradation of the performance of the disk drive. In some severe cases, poor BER will lead to a significant increase of unrecoverable data errors. FTE is particularly noticeable with perpendicular write heads that have side shields. FTE may not affect tracks symmetrically on both sides of the track being written. Tracks on one side may encounter more pronounced FTE effects due to the write head shield design or due to read-write head skew.

If the SMR disk drive has inter-band writeable CTRs, FTE can occur on the tracks in the boundary regions of the bands, i.e., those tracks near the IBGs, when data is written to the CTRs.

In this invention the SMR HDD has writeable CTRs in the IBGs. Variable incremented counting is performed for the shingled data tracks in the band boundary regions that are subjected to the FTE effect from writing to the CTRs in the IBGs. The magnitude or extent of the FTE effect is determined for each track in a boundary region that is within a range of tracks of the cache track being written, and based on the relative FTE effect for all the tracks in the range a count increment (CI) is determined. A count may be maintained for each track in a boundary region or a cumulative count maintained for all the tracks in a boundary region. In one implementation a counter is maintained for each of N tracks in each boundary region, where N is the track range of the effect of FTE from the write head. When data is written to one of the cache tracks, the counters for the N tracks in the adjacent boundary regions are increased by the predetermined increments based on the number of tracks from the cache track being written. When the count for any one of the N tracks of a boundary region reaches a predetermined threshold, the data in that band is rewritten. The data is rewritten before the FTE effects can build up, so the reliability of the data is improved. In another implementation, a single counter is maintained for each boundary region of N tracks. When data is written to one of the cache tracks, the counter for the adjacent boundary region is increased by a predetermined cumulative increment based on the number of N tracks that are within the range of the cache track being written. When the cumulative count for a boundary region reaches a predetermined threshold, the data in that band is rewritten.

Figure 3:
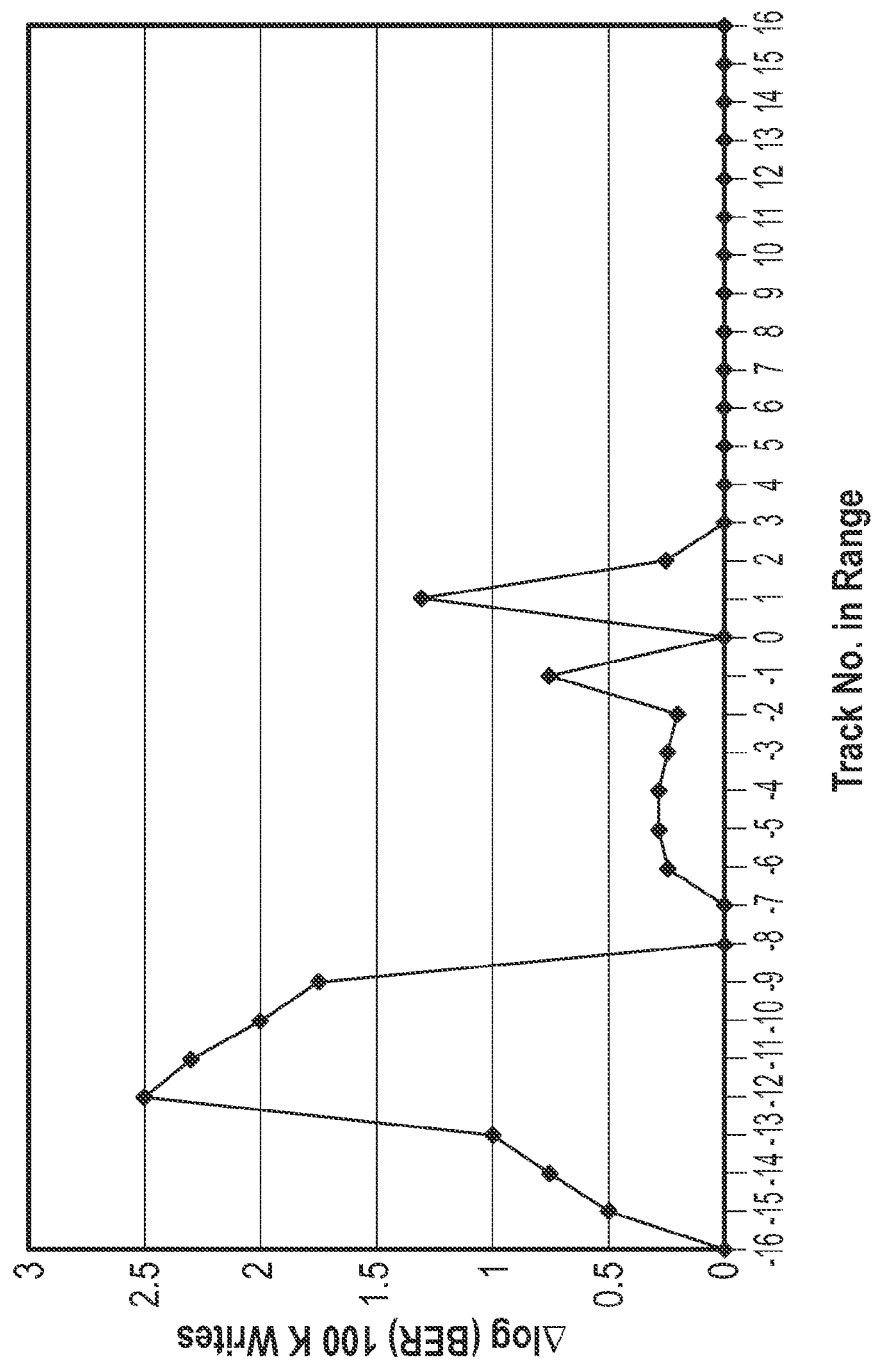
FIG. 3 is a graph of an example of measured bit error rate (BER) degradation values for a range of tracks written by a perpendicular recording head and illustrates the effect of far track erasure (FTE).

In one approach for determining the relative FTE effects on the tracks within a range of tracks of the track being written, the error rate is used to determine the count increments. A predetermined data pattern is written to all the tracks within a range of $-N$ to $+N$ tracks from a track (designated track 0). An initial "bit" error rate (BER) is then measured for each track in the range of 2N tracks. In one well-known approach for measuring BER, the HDD's error correction circuitry is deactivated, for example by setting to zero the value in the error correction register for the maximum number of errors to correct, and then the data pattern is read back and the number of bytes in error is counted. Since there must be at least one bit in error for each byte in error, this is the initial BER for each track in the range. Then track 0 is written a very large number of times (for example 100,000 writes). The BER is then again measured for all 2N tracks in the range. The degradation in BER is the difference between the measured BER after the writes to track 0 and the initial BER. FIG. 3 is a graph of measured BER degradation values for a range of 32 shingle data tracks written by a perpendicular write head. The y-axis of FIG. 3 is the difference in the logarithm of the measured BER after writes and the logarithm of the initial BER ($\Delta$ log (BER)). This graph shows the expected relatively large effect of the fringe fields at immediately adjacent tracks $-1$ and $+1$. The FTE effect is clearly shown by the high BER values for tracks $-9$ to $-15$, which are significantly higher than the BER values for tracks closer to track 0 (tracks $-2$ to $-8$). FIG. 3 also shows the unsymmetrical characteristic of FTE, with very low BER values for tracks between $+2$ and $+16$. From the measured BER degradation values, which represent the relative weightings of FTE for all the tracks within the range, a set of count increments can be calculated for all the tracks within the range. FIG. 4 is a table of shingled data track number (TR#), BER degradation value (logarithmic), and calculated count increment (CI) for 32 shingled data tracks within a range of −N to +N tracks (where N=16 in this example) for the perpendicular write head that produced the BER data of FIG. 3. In this example a Δ log (BER) of 0.75 is an arbitrary reference value (REF) and assigned a count increment of 1 (as shown by track −1). The count increments are then calculated for each track based on the BER degradation for that track. Because the BER values are logarithmic, a count increment (CI) is calculated for each track number (TR#) according to the following:

$$CI_{TR\#}=10^{[\Delta log(BER_{TR\#})-REF]}$$

Figure 5A:
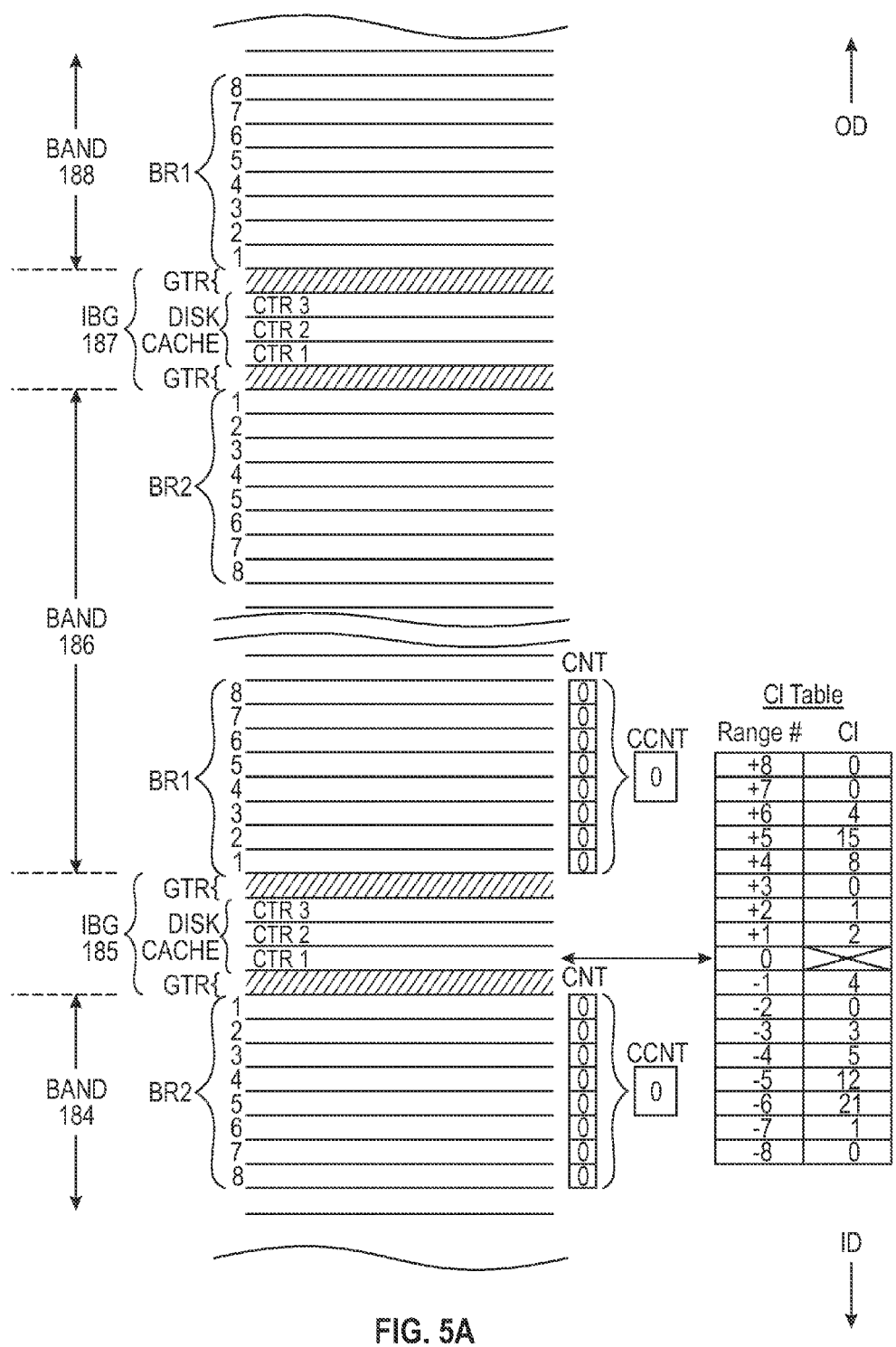
FIG. 5A is a schematic representation of a SMR disk showing three annular bands with inter-band gaps (IBGs) having writeable cache tracks (CTRs) and illustrating the count increment (CI) table aligned with CTR1 before writing to CTR1 and the track counters (CNTs) and band cumulative counter (CCNT) with 0 values.

In this invention, for every writing to a CTR in an IBG, at least one count is maintained for each of the two boundary regions adjacent the IBG. The method of the invention will be explained with FIGS. 5A-5D. In one implementation of the invention a count (CNT) is maintained for each track in each of the two boundary regions that is within N tracks of the CTR being written and each CNT is increased by its value of CI according to a table of CI values. In another implementation, a single cumulative count (CCNT) is maintained for each boundary region of each band and the CCNT is incremented by a cumulative count increment (CCI) for each writing to a CTR in an adjacent IBG. In FIG. 5A, portions of three annular bands 184, 186, 188 are depicted, with five-track wide (IBGs) 185, 187. Each band has 2 boundary regions, BR1 at the ID side and BR2 at the OD side. Each IBG has three CTRs with and two guard tracks (GTRs). Each GTR separates the CTRs from an adjacent data band. Writing to the CTRs in IBG 185 will have a FTE on both BR2 of band 184 and BR1 of band 186. In this example, the effect of FTE is from −8 tracks to +8 tracks, so N=8, a relatively small number for ease of illustration.

Figure 5B:
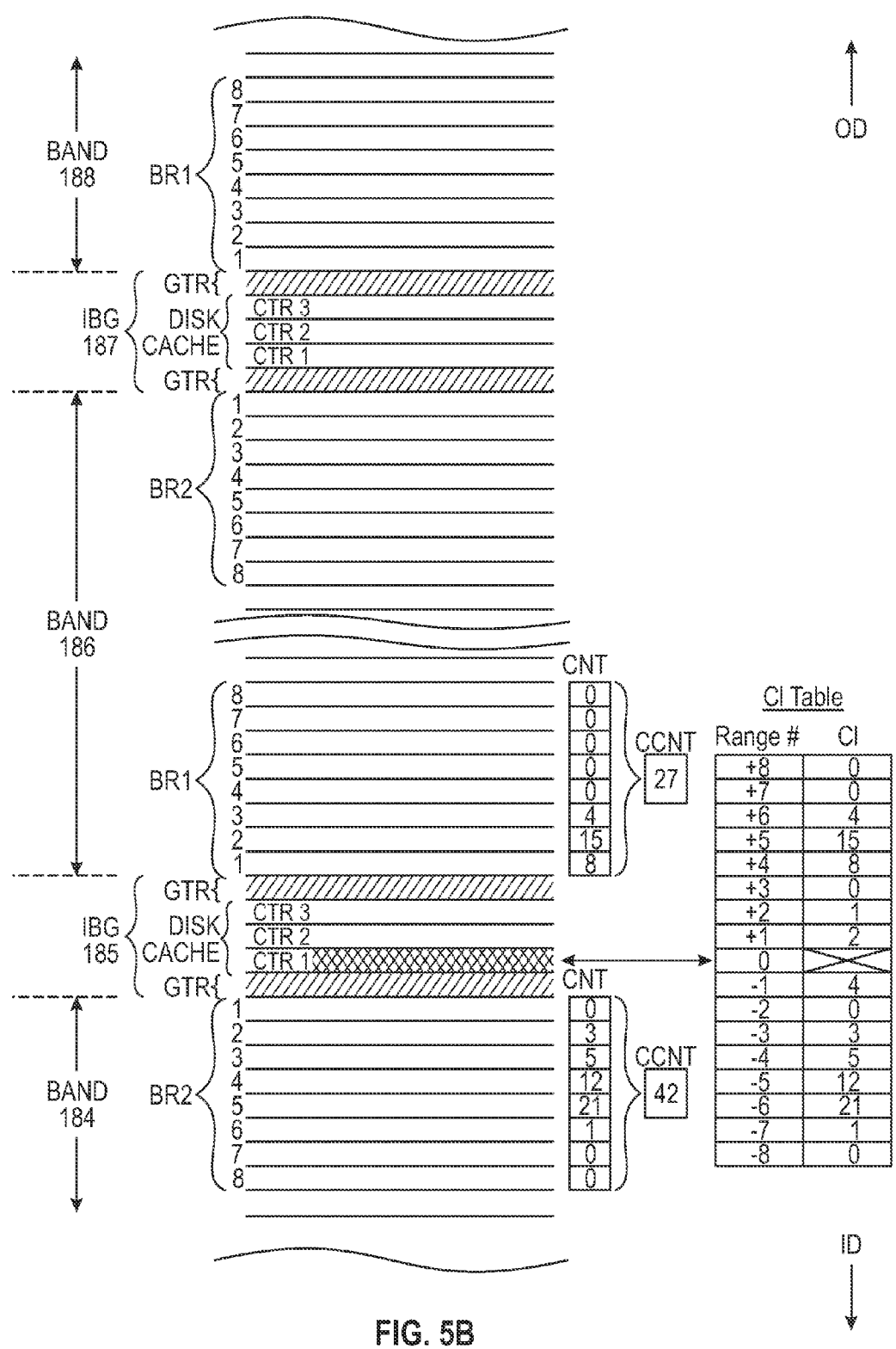
FIG. 5B is a schematic representation illustrating the count increment (CI) table aligned with CTR1 and the track counters (CNTs) and band cumulative counter (CCNT) with their incremented values after writing to CTR1.

In FIG. 5A, the center of the CI table is depicted as aligned with CTR1, which is the first CTR to be written. The CI table shows the CI values for the corresponding range numbers, i.e., the number of tracks from the track being written (Range #0). However, no CTR has yet been written so all counters, CNT and CCNT, have a count of 0. In FIG. 5B, CTR1 in IBG 185 has been written (as shown by cross-hatching of CTR1). Thus the center of the CI table is aligned with CTR1. As shown, the range of N tracks from CTR1 extends into tracks 1 through 7 in BR2 of band 184 and into tracks 1 through 5 in BR1 of band 186. Thus, the counters for each of these tracks have been incremented (from 0 in FIG. 5A) by the corresponding CI values from the CI table. For example, track 3 in BR1 of band 186 is +6 tracks from CTR1 and thus is incremented by the CI value of 4 and thus the CNT value for track 3 in BR1 of band 184 is 4. Similarly the single CCNTs for the bands have been incremented by the cumulative CI values, i.e, the sum of all the CI values.

Figure 5C:
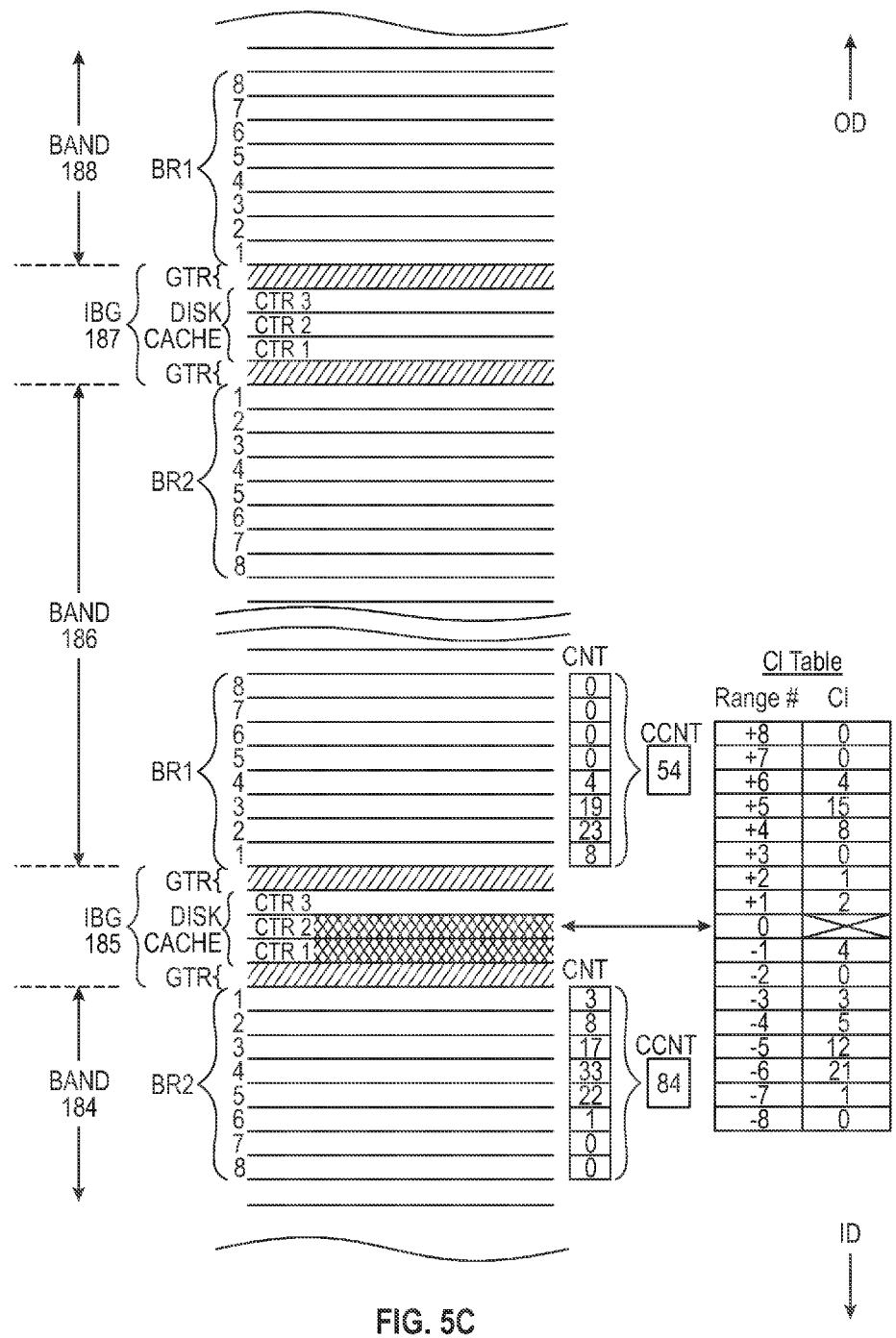
FIG. 5C is a schematic representation illustrating the count increment (CI) table aligned with CTR2 and the track counters (CNTs) and band cumulative counter (CCNT) with their incremented values after writing to CTR2.

In FIG. 5C, CTR2 in IBG 185 has been written (as shown by cross-hatching of CTR2). Thus the center of the CI table is now aligned with CTR2. As shown, the range of N tracks from CTRL now extends only into tracks 1 through 6 in BR2 of band 184 and into tracks 1 through 6 in BR1 of band 186. Thus, the counters for each of these tracks have now been incremented by the corresponding CI values. For example, track 3 in BR1 of band 186 is now +5 tracks from CTR2 and thus is incremented by the CI value of 15, so its CNT is now 19 (4+15). Similarly the single CCNTs for the bands have been incremented by the cumulative CI values, so the CCNT value in each band is now the sum of all CNTs for that band.

Figure 5D:
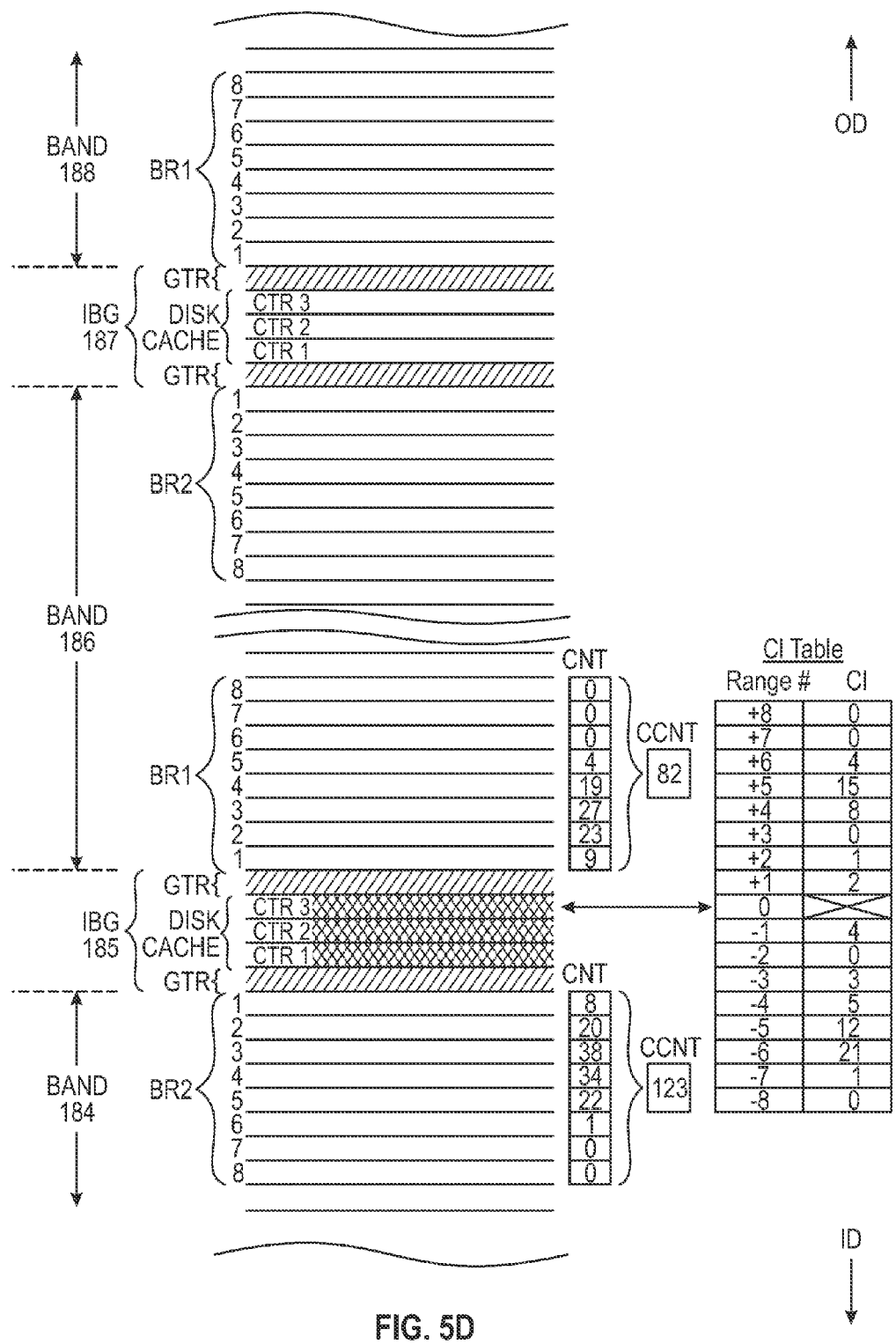
FIG. 5D is a schematic representation illustrating the count increment (CI) table aligned with CTR3 and the track counters (CNTs) and band cumulative counter (CCNT) with their incremented values after writing to CTR3.

In FIG. 5D, CTR3 in IBG 185 has been written (as shown by cross-hatching of CTR3). Thus the center of the CI table is now aligned with CTR3. As shown, the range of N tracks from CTR3 now extends only into tracks 1 through 5 in BR2 of band 184 and into tracks 1 through 7 in BR1 of band 186. Thus, the counters for each of these tracks have now been incremented by the corresponding CI values. For example, track 3 in BR1 of band 186 is now +4 tracks from CTR3 and thus is incremented by the CI value of 8, so its CNT is now 27 (4+15+8). Similarly, the single CCNTs for the bands have been incremented by the cumulative CI values, so the CCNT value in each band is now the sum of all CNTs for that band.

During operation of the HDD, the controller (HDC 12 in FIG. 1), or another controller or microprocessor in the HDD, identifies the cache track number where data is being written, recalls from the table the CI values for each track within the range and increases the counters for each track within the range by the recalled CI values. The table and the counters are stored in memory associated with controller 12, for example memory 14, which may be embedded in controller 12, volatile memory 50 or nonvolatile memory 52. When the count value for a track in the boundary region of a band reaches a predetermined threshold (T) the data is read from that band and rewritten to the band. The value for T can be chosen based on several factors, including the known track density of the HDD, the intended purpose of the HDD, the desired reliability, and the BER of the HDD measured during manufacturing. Thus, depending on these factors, T may be chosen to be a relatively high value, for example higher than 10,000, or a relatively low value, for example less than several hundred. After the data has been rewritten to a band, the counter or counters are reset to 0.

Figure 6:
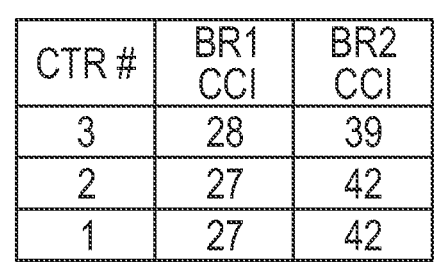

In the single cumulative count implementation of the invention, a single CCNT is maintained for each boundary region of each band and the CCNT is incremented by a cumulative count increment (CCI) for each writing to a cache track. A complete CCI table for the example of FIGS. 5A-5D is shown in FIG. 6. Thus the number of the CTR being written in is determined and the corresponding CCI value is recalled from the table and added to the cumulative count for the adjacent boundaries. The CCI values are related to the number of tracks between the cache track being written and the adjacent boundary region and represent the cumulative effect of FTE on all the tracks within the range of the cache track being written. When the CCNT value for a band reaches a predetermined threshold the data is read from that band and rewritten to the band. In this implementation only a single counter is required for a boundary region, i.e., only two counters for each band.

Because a HDD typically includes multiple disk surfaces, each with an associated read/write head, and because not all heads will have the same exact write profiles and thus not generate the same FTE effects, a table like that in FIG. 4 can be developed for each head and its associated disk surface. Also, because of head skew, the write profile and thus the FTE effect for a particular head may vary depending on the radial position of the head. Thus multiple tables like the table in FIG. 4 may be maintained for each head, depending on the radial position of the head.

The operation of the HDD as described above may be implemented as a set of computer program instructions stored in memory and executable by a processor, such as the HDC, or a separate controller or microprocessor in the HDD. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A shingled magnetic recording disk drive comprising:
a magnetic recording disk having a recording surface with a plurality of concentric shingled data tracks arranged in annular bands separated by annular inter-band gaps, each band having a boundary region of tracks adjacent a gap, whereby each gap is located between adjacent boundary regions and wherein each gap contains at least one writable cache track;
a write head associated with said disk surface for generating a magnetic write field to write data to the data tracks;
a read head for reading data written in the data tracks;
a controller for controlling the writing of data by the write head to the data tracks; and
memory coupled to the controller and containing a program of instructions readable by the controller for minimizing the effect of encroachment of the write field on data tracks in the boundary regions when a cache track is being written in an inter-band gap, the program of instructions undertaking the method acts comprising:
(a) maintaining in memory at least one count for each boundary region;
(b) for each writing of data to a cache track, increasing said at least one count for an adjacent boundary region by a predetermined increment, said increment being determined from the number of tracks between the cache track being written and said adjacent boundary region; and
(c) when a count reaches a predetermined threshold, reading the data from the band containing said threshold-count boundary region and rewriting the data read from said band.

2. The disk drive of claim 1 wherein there are N tracks in each boundary region and wherein maintaining in memory at least one count for each boundary region comprises maintaining a count for each of said N tracks.

3. The disk drive of claim 2 wherein step (b) comprises:
for each writing of data to a cache track, increasing said at least one count for each of said N tracks in an adjacent boundary region by a predetermined increment, said increment being determined from the number of tracks between the cache track being written and the track whose count is being incremented.

4. The disk drive of claim 3 wherein the effect of encroachment of the write field on data tracks is within a range between −N tracks and +N tracks and further comprising a table in memory of 2N tracks having range numbers between −N and +N and corresponding 2N count increment values, and wherein the method act of increasing said at least one count for each of said N tracks in an adjacent boundary region by a predetermined increment includes determining the range number for each track within said range and recalling from the table in memory the corresponding count increment value.

5. The disk drive of claim 4 wherein each of the count increment values is related to a measured error rate for the corresponding track.

6. The disk drive of claim 1 wherein there are N tracks in each boundary region and wherein maintaining in memory at least one count for each boundary region comprises maintaining a cumulative count for each boundary region.

7. The disk drive of claim 6 wherein step (b) comprises:
for each writing of data to a cache track, increasing said cumulative count for an adjacent boundary region by a predetermined cumulative count increment, said cumulative count increment being determined from which of the cache tracks is being written.

8. The disk drive of claim 7 further comprising a table in memory of cache track numbers and corresponding cumulative count increment values, and wherein the method act of increasing said cumulative count by a predetermined increment includes determining the track number for the cache track being written and recalling from the table in memory the corresponding cumulative count increment value.

9. The disk drive of claim 8 wherein each of the cumulative count increment values is related to the sum of the measured error rates for all the tracks within the range of the cache track being written.

10. The disk drive of claim 1 wherein the disk drive has a plurality of disk surfaces, each having a plurality of concentric data tracks, and associated write heads, and wherein the program of instructions comprises undertaking method acts (a) through (c) for each disk surface.

11. The disk drive of claim 1 wherein the memory is non-volatile memory.

12. A magnetic recording disk drive comprising:
a rotatable magnetic recording disk comprising a substrate and a magnetic recording layer on the substrate;
a head carrier having a recording-layer-facing surface;
a write head on the head carrier, the write head generating a generally circular path of magnetic transitions in the recording layer as the disk rotates;
an actuator connected to the head carrier for moving the head carrier generally radially across the disk, the actuator being capable of moving the head in an increment less than the radial width of a path, whereby the write head generates partially overlapping generally circular paths of magnetic transitions, the non-overlapping portions of the circular paths representing data tracks, the data tracks being arranged in annular bands separated by annular inter-band gaps, each band having a boundary region of data tracks adjacent a gap, whereby each gap is located between adjacent boundary regions and wherein each gap contains a plurality of writable cache tracks;
a read head on the carrier for reading written data from the data tracks;
memory coupled to the controller and containing a program of instructions readable by the controller for minimizing the effect of encroachment of the write field on data tracks in boundary regions when a cache track is being written in an adjacent inter-band gap, the program of instructions undertaking the method acts comprising:
(a) maintaining in memory a cumulative count for each boundary region;
(b) maintaining in memory a table of cache track numbers and corresponding cumulative count increment (CCI) values;
(c) for each writing of data to a cache track, determining the cache track number and recalling from said table the corresponding CCI;
(d) increasing said cumulative count by said recalled CCI for the boundary region adjacent the inter-band gap containing the cache track being written; and
(e) when said cumulative count reaches a predetermined threshold, reading the data from the band containing said threshold-count boundary region and rewriting the data read from said band.

13. The disk drive of claim 12 wherein each of the CCI values is related to the sum of the measured error rates for all the tracks within a range of tracks of the cache track being written.

14. The disk drive of claim 12 wherein the disk drive has a plurality of disk surfaces, each having a plurality of data tracks, and associated write heads, and wherein the program of instructions comprises undertaking method acts (a) through (e) for each disk surface.

15. The disk drive of claim 12 wherein the memory is nonvolatile memory.

* * * * *